United States Patent
Kanou et al.

(10) Patent No.: US 8,438,632 B2
(45) Date of Patent: May 7, 2013

(54) IMAGE PROCESSING DEVICE

(75) Inventors: Masayuki Kanou, Kyoto (JP); Kenji Dokuni, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 207 days.

(21) Appl. No.: 12/790,357

(22) Filed: May 28, 2010

(65) Prior Publication Data
US 2010/0242107 A1 Sep. 23, 2010

Related U.S. Application Data

(63) Continuation of application No. 11/470,151, filed on Sep. 5, 2006, now abandoned.

(30) Foreign Application Priority Data

Oct. 7, 2005 (JP) .................................. 2005-295729

(51) Int. Cl.
*G06F 21/00* (2006.01)
(52) U.S. Cl.
USPC ................... 726/16; 726/17; 726/18; 726/19; 726/9; 713/150; 713/151; 713/152; 713/153; 713/168; 713/169; 713/170; 713/171; 713/172; 713/173; 713/174

(58) Field of Classification Search .......... 726/9, 16–20; 713/182–186, 150–153, 168–174
See application file for complete search history.

(56) References Cited

U.S. PATENT DOCUMENTS

| 5,864,613 | A  | * | 1/1999 | Flood ............................ 379/188 |
| 6,745,334 | B1 | * | 6/2004 | Ikegami ........................... 726/19 |
| 2003/0135737 | A1 | | 7/2003 | Bouthors ....................... 713/176 |
| 2004/0049684 | A1 | | 3/2004 | Nomura et al. ............... 713/182 |
| 2007/0074284 | A1 | * | 3/2007 | Woog ............................. 726/16 |

FOREIGN PATENT DOCUMENTS

| JP | 09-319448 | 12/1997 |
| JP | 2001-357012 | 12/2001 |

OTHER PUBLICATIONS

Chuan-Lin et, al. " Star: A Local Network System for Real-Time Management of Imagery Data", Oct. 1982, IEEE, vol. c-31.*

* cited by examiner

*Primary Examiner* — Taghi Arani
*Assistant Examiner* — Josnel Jeudy
(74) *Attorney, Agent, or Firm* — DLA Piper LLP (US)

(57) ABSTRACT

A low-cost Multi Function Peripheral (MFP) prevents a user from forgetting to cancel an authenticated state. The MFP includes a scanner unit, a printer unit, a touch screen, and a reset key for initializing various settings. When the user is authenticated, the MFP accepts various operations. Under a state in which the user is authenticated, when the reset key is operated, a control unit executes a logout process.

4 Claims, 3 Drawing Sheets

IMAGE PROCESSING DEVICE

RELATED APPLICATIONS

This application is a continuation of U.S. application Ser. No. 11/470,151, filed on Sep. 5, 2006, and claims priority under 35 USC 119 in Japanese patent application no. 2005-295729, filed on Oct. 7, 2005, which applications are incorporated by reference in their entireties.

BACKGROUND OF THE INVENTION

1. Field of the Invention

The present invention relates to an image processing device such as a Multi Function Peripheral (MFP) including a copy function, a facsimile function and a scanner function or the like, a copier and a facsimile machine. In particular, the present invention relates to an image processing device which carries out an authentication of a user and cancellation of the authentication.

2. Description of the Related Art

A conventional MFP carries out authentication of a user by accepting an entry of a user ID and a password and sending an inquiry to an authentication server. When the authentication succeeds, the MFP offers a facsimile function, a copy function or a scanner function to the user. Specifically, the MFP transmits the accepted user ID and the password to the authentication server via a network such as a Local Area Network (LAN) and the Internet, and requests the authentication. Then, the MFP receives information indicating an authentication result from the authentication server. When the MFP determines that the authentication has succeeded in accordance with the received authentication result, the MFP offers various functions to the user.

The conventional MFP includes a logout key, an operation panel, and a reset key or the like. The logout key is operated for accepting an instruction to cancel a state in which the user is authenticated. The operation panel accepts a setting for various functions. For example, the operation panel accepts a setting regarding a number of sets of copies for the copy function, and a setting regarding an image quality or the like for the facsimile function. The reset key is operated for initializing the setting.

The MFP configured as described above offers various functions to only a pre-registered prescribed user.

After the user uses the MFP, the user may forget to operate the logout key and walk away from the MFP without canceling the authenticated state. When the user walks away from the MFP without operating the logout key, other non-authenticated users may freely operate the MFP. This is not preferable from an aspect of security.

The above-described problem occurs not only with the MFP but also with an image processing device such as a copier and a facsimile machine including an authentication function.

SUMMARY OF THE INVENTION

The present invention has been made in order to overcome the problems described above. Since a user habitually initializes various settings by operating a reset key at an end of an operation of the image processing device, the reset key is less likely to be forgotten to be operated compared with a logout key. Thus, an advantage of the present invention is to provide an image processing device which prevents the user from forgetting to cancel an authenticated state by configuring the image processing device to cancel the authenticated state when the reset key is operated.

Another advantage of the present invention is to provide an image processing device which visually urges a user to cancel an authenticated state by configuring the image processing device to display an indication to cancel the authenticated state and to accept cancellation of the authenticated state when a reset key is operated.

Another advantage of the present invention is to provide an image processing device which utilizes an existing reset key as an operation key for canceling an authenticated state and initializing various settings by configuring the image processing device to initialize various settings when the reset key is operated again under a state in which the reset key is operated and an indication to cancel an authenticated state is displayed. Further, such an image processing device can be manufactured economically.

According to one aspect of the present invention, when a storage unit of an image processing device stores prescribed data indicating that a user has been authenticated, the image processing device accepts an operation and a setting relating to an image processing. The image processing device includes an initialization operation unit arranged to initialize the setting relating to the image processing. The image processing device also includes a deletion unit arranged to delete the prescribed data when the storage unit stores the prescribed data and the initialization operation unit is operated.

Under a state in which the storage unit stores the prescribed data indicating the state in which the user has been authenticated, when the initialization operation unit, e.g., a reset key is operated, the deletion unit deletes the prescribed data stored in the storage unit. That is, under a state in which the user is authenticated, when the initialization operation unit is operated, the deletion unit executes a process for canceling the state in which the user is authenticated. Since the user habitually initializes various settings after an operation of the image processing device has been completed, the user is less likely to forget to operate the initialization operation unit than a logout key. Therefore, compared with a conventional image processing device which cancels the authenticated state when the logout key is operated, the user is less likely to forget the operation for canceling the authenticated state.

According to another aspect of the present invention, the image processing device also includes a display unit and an accepting unit. When the initialization operation unit is operated, the display unit displays an indication to delete the prescribed data. When the display unit displays the indication to delete the prescribed data, the accepting unit accepts an instruction to delete the prescribed data. When the accepting unit accepts the instruction to delete the prescribed data, the deletion unit deletes the prescribed data.

When the initialization operation unit is operated, the display unit displays the indication to delete the prescribed data, i.e., an indication to cancel the authenticated state. Then, the accepting unit accepts the instruction to delete the prescribed data. When the accepting unit accepts the instruction to delete the prescribed data, the deletion unit deletes the prescribed data, i.e., cancels the authenticated state.

According to another aspect of the present invention, the image processing device also includes an initialization unit which initializes the setting relating to the image processing when the display unit displays the indication to delete the prescribed data and the initialization operation unit is operated.

Under a state in which the display unit is displaying the indication to cancel the authenticated state, when the initialization operation unit is operated, the image processing device initializes the setting relating to the image processing. Therefore, the initialization operation unit may also function as an operation key for initializing the setting and canceling the authenticated state.

According to these aspects of the present invention, since the authenticated state is cancelled when the initialization operation unit is operated, it is possible to prevent the user from forgetting to cancel the authenticated state.

According to these aspects of the present invention, by displaying the indication to cancel the authenticated state and accepting an instruction to cancel the authenticated state, the image processing device can urge the user to cancel the authenticated state.

According to these aspects of the present invention, the existing initialization operation, unit may also function as an operation key for initializing the setting and canceling the authenticated state. Accordingly, the image processing device may be manufactured more economically. The user may wish to cancel the authenticated state, or wish to initialize the setting while maintaining the authenticated state. The image processing device according to the present invention can select either canceling or initializing according to a demand of the user.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
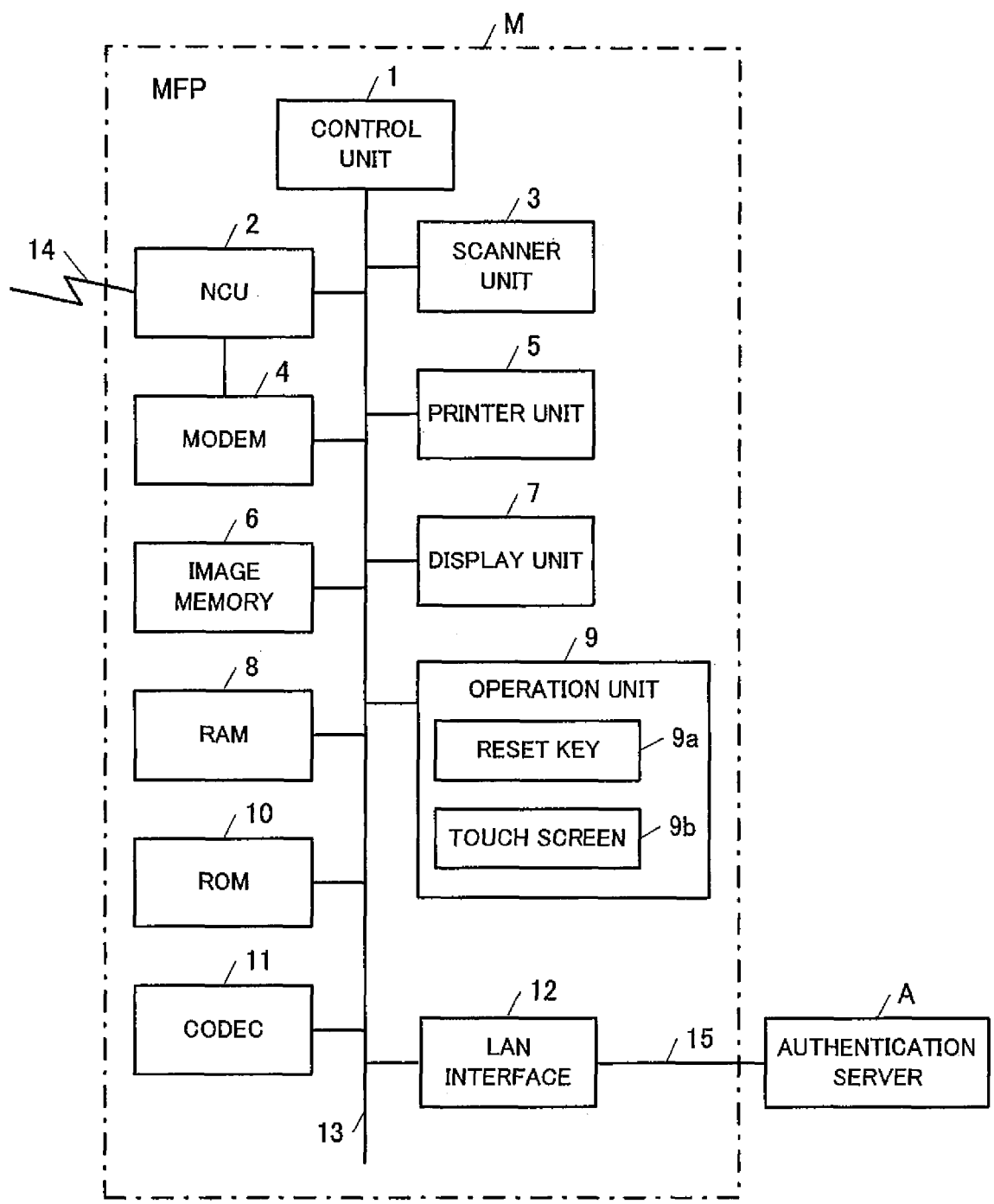
FIG. 1 is a block diagram illustrating a configuration of an MFP according to an embodiment of the present invention.

Embodiments of the present invention will be described with reference to the drawings. FIG. 1 is a block diagram illustrating a configuration of an MFP M according to an embodiment of the present invention. In this embodiment, the MFP M includes a network authentication function. When a user is authenticated, the MFP M offers a copy function, a facsimile function, a scanner function or the like to the user.

Reference numeral 1 denotes a control unit including a Central Processing Unit (CPU). The MFP M includes a scanner unit 3, an image memory 6, and a printer unit 5. The scanner unit 3 scans an original document, and acquires image data of the original document. The image memory 6 temporarily stores the acquired image data. The printer unit 5 prints an image onto paper in accordance with the image data stored in the image memory 6. The control unit 1 controls acquiring and printing of the image data via a bus 13 to realize the copy function.

A Read Only Memory (ROM) 10 and a Random Access Memory (RAM) 8 are connected to the bus 13. The ROM 10 includes a flash memory, and stores various control programs necessary for an operation of the MFP M. The control unit 1 fetches a control program stored in the ROM 10 to the RAM 8 and executes the control program to realize various functions such as the copy function and the facsimile function of the MFP M.

The scanner unit 3 includes a light source that irradiates light on the original document, and an optical element such as a line Charge Coupled Device (CCD) that converts reflected light reflected from the original document into an electric signal. The scanner unit 3 acquires image data of the original document in accordance with the electric signal converted by the line CCD. The scanner unit 3 provides the acquired image data to the image memory 6.

The printer unit 5 is an electrophotographic printer device including a photoconductive drum and a fixing unit or the like. The printer unit 5 includes, a flash ROM (not illustrated) that stores a program for a printing process. The printer unit 5 prints an image relating to the image data onto paper in accordance with the program stored in the flash ROM.

The MFP M also includes a Network Control Unit (NCU) 2, a Modulator Demodulator (MODEM) 4, and a Coder Decoder (CODEC) 11. The NCU 2 and the MODEM 4 transmit and receive the image data by facsimile communication. The CODEC 11 encodes and decodes transmission image data and received image data by a prescribed encoding scheme, e.g., the Modified Huffman (MH), the Modified Relative Address Designate (MR), or the Modified MR (MMR) coding scheme. The control unit 1 controls transmission and reception of the image data, scanning of the original document, and printing of an image to realize the facsimile function.

The MODEM 4 is connected to the bus 13. The MODEM 4 includes a function for demodulating analog image data input from a Public Switched Telephone Network (PSTN) into digital image data. The MODEM 4 also includes a function for modulating image data provided from the image memory 6 via the bus 13 into an analog signal by a control of the control unit 1.

The NCU 2 is a hardware which carries out an operation of making and breaking the PSTN and a communication line 14. The NCU 2 connects the MODEM 4 and the PSTN according to the control of the control unit 1.

The CODEC 11 encodes the image data scanned by the scanner unit 3, and provides the encoded image data to the MODEM 4 according to the control of the control unit 1. The CODEC 11 also decodes the image data received by the facsimile communication, and stores the decoded image data in the image memory 6.

The MFP M also includes a LAN interface 12. The LAN interface 12 is an interface for transmitting and receiving image data, data relating to authentication of a user or the like to and from a remote device via the LAN 15.

A remote authentication server (A) is connected to the LAN interface 12 via the LAN 15. The authentication server (A) includes a directory and a Lightweight Directory Access Protocol (LDAP) server. The directory previously stores a user ID and a password of each user for authenticating a user of the MFP M. The LDAP server transmits data of an authentication result indicating success or failure of the authentication to the MFP M according to a request of the MFP M.

An operation unit 9 and a display unit 7 are connected to the bus 13 for operating the MFP M.

The display unit 7 includes a liquid crystal display that displays an operation state of the MFP M, and a soft key for operating the MFP M.

The display unit 9 includes a resistive or a capacitance touch screen 9b arranged on the display unit 7. The operation unit 9 accepts an operation performed on the soft key displayed on the display unit 7 to enable the control unit 1 to detect the operation state of the touch screen 9b. The operation unit 9 includes push-button typed keys, a ten-key numeric pad, and a reset key 9a. The ten-key numeric pad is arranged for setting a number of sets to be printed and for accepting a user ID and a password, for example. The reset key 9a is arranged for initializing various settings such as a number of sets to be printed.

Figure 2:
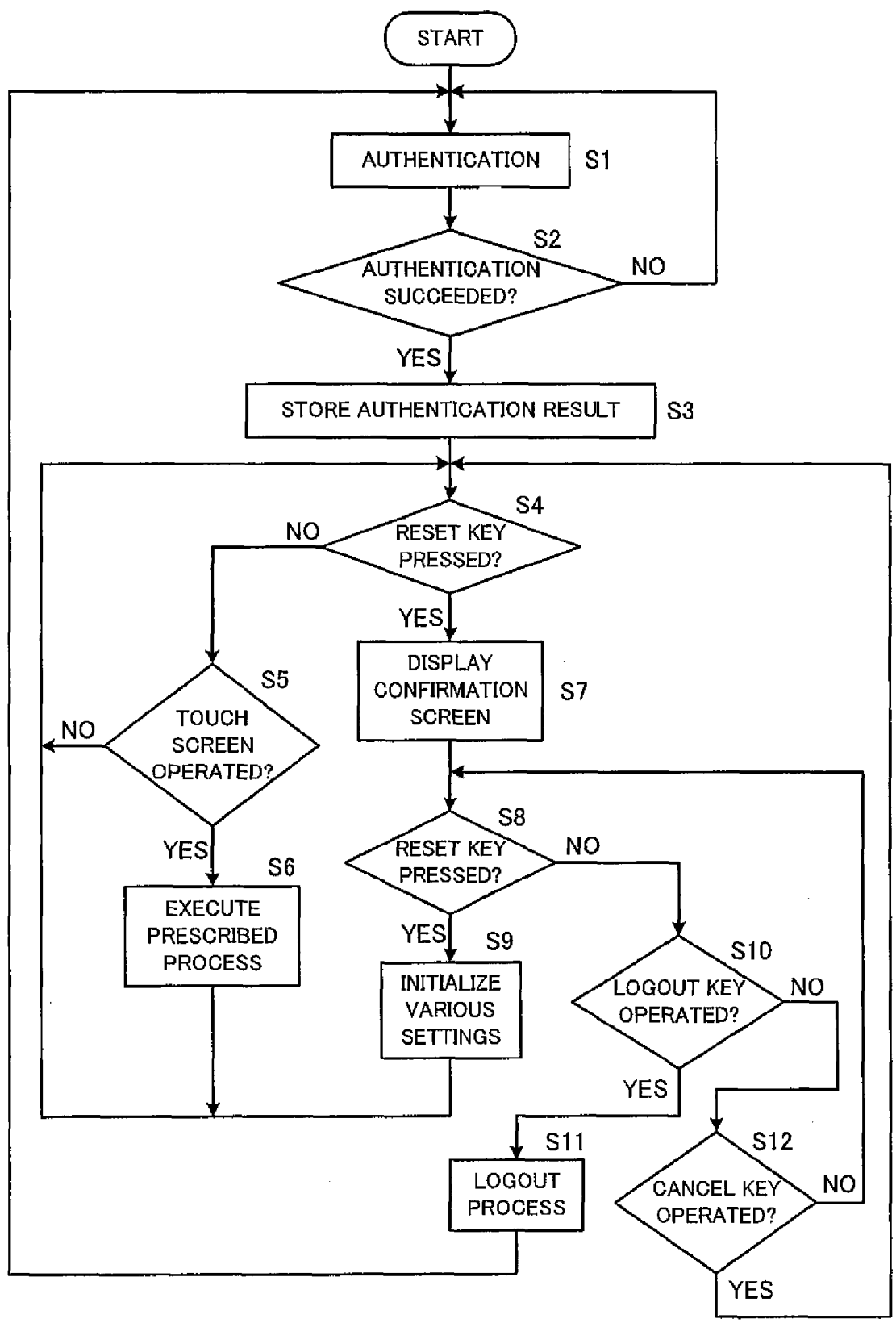
FIG. 2 is a flowchart illustrating a communication protocol of a control unit relating to authentication of a user and cancellation of an authenticated state.

FIG. 2 is a flowchart illustrating a processing protocol of the control unit 1 relating to the authentication of the user and cancellation of an authenticated state. When power is turned on, the control unit 1 authenticates a user who will use the MFP M (step S1). Specifically, the display unit 7 displays an entry image requesting the user to enter a user ID and a password, and the control unit 1 accepts the user ID and the password. Then, the control unit 1 transmits the accepted user ID and the password along with data requesting the authentication to the authentication server (A) via the LAN interface 12. When the authentication server (A) receives the data, the authentication server (A) determines success or failure of the authentication by comparing the user ID and the password, which are previously registered in the authentication server (A), with the received user ID and the password. Then, the authentication server transmits data of an authentication result indicating success or failure of the authentication to the MFP M via the LAN 15. The control unit 1 receives the data transmitted from the authentication server (A).

Next, the control unit 1 determines success or failure of the authentication in accordance with the received data (step S2). When the control unit 1 determines that the authentication has failed (step S2: NO), the control unit 1 returns the process to step S1.

When the control unit 1 determines that the authentication has succeeded (step S2: YES), the control unit 1 stores the authentication result, i.e., prescribed data indicating that the authentication has succeeded, in the RAM 8 (step S3).

Next, the control unit 1 detects an operation state of the reset key 9a to determine whether or not the reset key 9a has been pressed (step S4).

When the control unit 1 determines that the reset key 9a has not been pressed (step S4: NO), the control unit 1 determines whether or not a key other than the reset key 9a or the touch screen 9b has been operated (step S5).

When a determination is made that the other key or the touch screen 9b has been operated (step S5: YES), the control unit 1 executes a prescribed process according to the operated key or an operated portion on the touch screen 9b (step S6). For example, the control unit 1 executes a process for starting a printing operation. Alternatively, the control unit 1 executes a process for storing an entered number of sets to be printed, or a setting of an image quality or the like in the RAM 8. Then, the control unit 1 returns the process to step S4. When a determination is made that the other key or the touch screen 9b has not been operated (step S5: NO), the control unit 1 returns the process to step S4.

When a determination is made at step S4 that the reset key 9a has been operated (step S4: YES), the control unit 1 displays a logout confirmation screen and a soft key of logout key and a cancel key on the display unit 7 (step S7). Further, the logout confirmation screen displays an indication to accept cancellation of the authenticated state.

Figure 3:
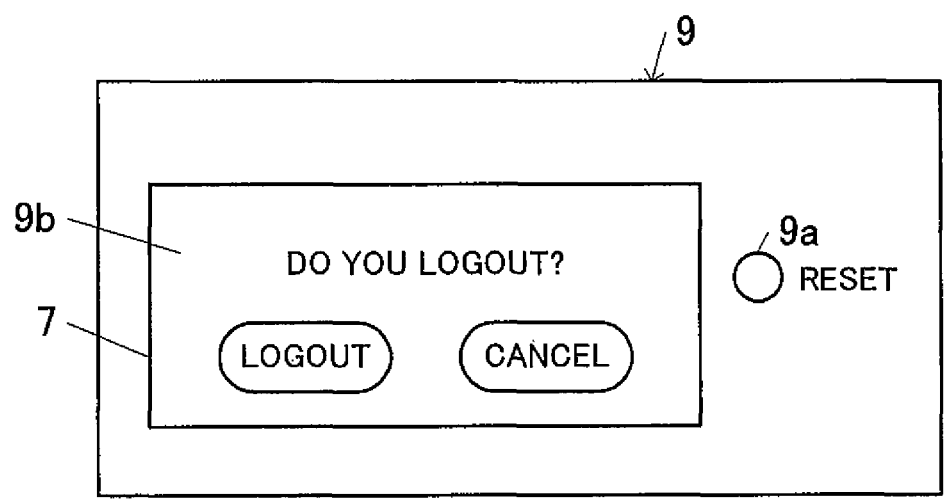
FIG. 3 illustrates a display unit displaying an indication to accept cancellation of an authenticated state, and a reset key.

FIG. 3 illustrates the display unit 7 displaying an indication to accept cancellation of the authenticated state, and the reset key 9a. As illustrated in FIG. 3, the display unit 7 displays characters of "DO YOU LOGOUT?", a logout key and a cancel key at the process of step S7.

After the process of step S7, the control unit 1 detects the operation state of the reset key 9a to determine whether or not the reset key 9a has been pressed (step S8). When a determination is made that the reset key 9a has been pressed (step S8: YES), the control unit 1 initializes various settings (step S9).

Specifically, the control unit 1 returns the number of sets to be printed and the setting of the image quality or the like stored in the RAM 8 at the process of step S6 to a default setting stored in the ROM 10. When a determination is made that the reset key 9a has not been pressed (step S8: NO), the control unit 1 detects the operation state of the touch screen 9b to determine whether or not the logout key has been operated (step S10).

When a determination is made that the logout key has been operated (step S10: YES), the control unit 1 executes a logout process (step S11), and returns the process to step S1. Specifically, the control unit 1 deletes the prescribed data stored in the RAM 8 indicating that the authentication of the user has succeeded.

When a determination is made that the logout key has not been operated (step S10: NO), the control unit 1 detects the operation state of the touch screen 9b to determine whether or not the cancel key has been operated (step S12).

When a determination is made that the cancel key has been operated (step S12: YES), the control unit 1 returns the process to step S4. When a determination is made that the cancel key has not been operated (step S12: NO), the control unit returns the process to step S8.

In the above-described MFP M, when the reset key 9a is pressed under a state in which the user is authenticated, the display unit 7 displays an indication to cancel the authenticated state and the MFP M accepts the cancellation of the authenticated state. Therefore, the MFP M can urge the user to cancel the authenticated state, and prevent the user from forgetting to cancel the authenticated state. Moreover, the user may wish to cancel the authenticated state, or to initialize the setting while maintaining the authenticated state. The user may select either canceling or initializing according to a demand of the user.

The existing reset key 9a may also function as an operation key for initializing various settings and for canceling the authenticated state. In such a case, compared with an MFP including the reset key 9a and the logout key, the MFP can be manufactured economically.

Further, the above-described embodiment relates to the MFP. However, the present invention is not limited to the above-described embodiment. The present invention is applicable to an image processing device, such as a copier and a facsimile machine, including a user authentication function.

The above-described embodiment relates to the MFP including the network authentication function. However, the present invention is not limited to the above-described embodiment. The MFP may include a storage unit storing data necessary for the authentication, and the MFP may carry out the authentication. Moreover, in the above-described embodiment, the prescribed data indicating that the authentication has been carried out is stored in the RAM. However, the prescribed data may be stored in another storage unit.

While the present invention has been described with respect to embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:
1. An image processing device comprising:
a reset key that is pressed to initialize an operation and a setting relating to an image processing;
a central processing unit that determines whether the reset key has been pressed a first time, executes a screen display function if the reset key has been pressed the first time, determines whether the reset key has been pressed a second time, based on whether the reset key is pressed the second time, determines whether an authenticated state should be canceled, and deletes the prescribed data when it is determined that the authenticated state should be canceled; and a storage unit that stores prescribed data indicating the authenticated state, wherein the image processing comprises at least one of printing, scanning and facsimile communication.

2. A method for canceling an authenticated state in an image processing device comprising:

storing prescribed data indicating the authenticated state;

performing at least one of printing, scanning and facsimile communication;

determining whether a reset key has been pressed a first time;

if the reset key has been pressed the first time, executing a screen display function;

determining whether the reset key has been pressed a second time;

based on whether the reset key is pressed the second time, determining whether the authenticated state should be canceled; and deleting the prescribed data when it is determined that the authenticated state should be canceled.

3. The method according to claim 1, further comprising:

executing a logout process when it is determined that the authenticated state should be canceled.

4. The method according to claim 3, wherein the logout process comprises deleting the prescribed data indicating the authenticated state.

* * * * *